United States Patent
Sánchez Ortiga et al.

(10) Patent No.: US 9,915,919 B2
(45) Date of Patent: Mar. 13, 2018

(54) MICROSCOPE, METHOD AND COMPUTER PROGRAM FOR OBTAINING QUANTITATIVE PHASE IMAGES BY MEANS OF DIGITAL HOLOGRAPHIC MICROSCOPY

(71) Applicants: UNIVERSITAT DE VALENCIA, Valencia (ES); UNIVERSIDAD NACIONAL DE COLUMBIA, Bogotá D.C. (CO)

(72) Inventors: Emilio Sánchez Ortiga, Valencia (ES); Manuel Martínez Corral, Valencia (ES); Ana Doblas Expósito, Valencia (ES); Genaro Saavedra Tortosa, Valencia (ES); Jorge Iván García Sucerquia, Bogotá D.C. (CO)

(73) Assignees: UNIVERSITAT DE VALENCIA, Valencia (ES); UNIVERSIDAD NACIONAL DE COLOMBIA, Edificio Uriel Gutierrez Bogata D.C. (CO)

( * ) Notice: Subject to any disclaimer, the term of this patent is extended or adjusted under 35 U.S.C. 154(b) by 38 days.

(21) Appl. No.: 15/033,608

(22) PCT Filed: Oct. 27, 2014

(86) PCT No.: PCT/IB2014/002224
§ 371 (c)(1),
(2) Date: Apr. 29, 2016

(87) PCT Pub. No.: WO2015/063566
PCT Pub. Date: May 7, 2015

(65) Prior Publication Data
US 2016/0252880 A1 Sep. 1, 2016

(30) Foreign Application Priority Data
Oct. 30, 2013 (ES) .................... 201331584

(51) Int. Cl.
| | | |
|---|---|---|
| G03H 1/00 | (2006.01) | |
| G02B 21/00 | (2006.01) | |
| G02B 21/14 | (2006.01) | |
| G02B 21/36 | (2006.01) | |
| G03H 1/04 | (2006.01) | |
| G02B 13/00 | (2006.01) | |

(Continued)

(52) U.S. Cl.
CPC ....... G03H 1/0005 (2013.01); G02B 13/0095 (2013.01); G02B 13/22 (2013.01);
(Continued)

(58) Field of Classification Search
CPC .... G03H 1/0005; G03H 1/041; G03H 1/0443; G03H 1/16; G03H 2001/005;
(Continued)

(56) References Cited

U.S. PATENT DOCUMENTS

| | | |
|---|---|---|
| 6,943,924 B2 | 9/2005 | Marquet et al. |
| 7,362,449 B2 | 4/2008 | Dubois et al. |

(Continued)

FOREIGN PATENT DOCUMENTS

| | | |
|---|---|---|
| EP | 1748327 A1 | 1/2007 |
| EP | 2565725 A1 | 3/2013 |

(Continued)

OTHER PUBLICATIONS

J. Kuhn, F. Charriere, T. Colomb, E. Cuche, F. Montfort, Y. Emery, P. Marquet, and C. Depeursinge, "Axial sub-nanometer accuracy in digital holographic microscopy," Measurement Science & Technology 19, 074007 (2008).

(Continued)

*Primary Examiner* — Jade R Chwasz
(74) *Attorney, Agent, or Firm* — Robert J. Hess; Hess Patent Law Firm (57) ABSTRACT

A microscope, method and computer program for obtaining quantitative phase images by digital holographic microscopy. The microscope includes: a coherent light source (1) and a beam splitter (3) for generating an object beam (Lo) for illuminating a sample, and a reference beam (Lr); an optical system with a main optical path making up a telecentric afocal system, and a reference optical path; and recording means (12) recording a hologram of said sample in the image plane of the optical system. The method includes recording a hologram in the image plane of an optical telecentric afocal system. The computer program is adapted for implementing part of the steps of the method.

15 Claims, 6 Drawing Sheets

(51) Int. Cl.
G02B 13/22 (2006.01)
G02B 21/04 (2006.01)
G02B 27/30 (2006.01)
G03H 1/16 (2006.01)

(52) U.S. Cl.
CPC ......... *G02B 21/0088* (2013.01); *G02B 21/04* (2013.01); *G02B 21/14* (2013.01); *G02B 21/36* (2013.01); *G02B 21/367* (2013.01); *G02B 27/30* (2013.01); *G03H 1/041* (2013.01); *G03H 1/0443* (2013.01); *G03H 1/16* (2013.01); *G03H 2001/005* (2013.01); *G03H 2001/0452* (2013.01)

(58) Field of Classification Search
CPC ......... G03H 2001/0452; G03H 1/0402; G03H 1/0465; G02B 13/0095; G02B 13/22; G02B 21/0088; G02B 21/04; G02B 21/14; G02B 21/36; G02B 21/367; G02B 27/30; G02B 21/06; G02B 21/361; G02B 21/00; G02B 21/0016; G02B 21/002; G02B 21/006; G02B 21/22
USPC .......................................................... 359/30
See application file for complete search history.

(56) References Cited

U.S. PATENT DOCUMENTS

| | | | |
|---|---|---|---|
| 8,325,400 | B2 | 12/2012 | Chen et al. |
| 8,363,316 | B2 | 1/2013 | Asundi et al. |
| 9,164,479 | B2 | 10/2015 | Das et al. |
| 2002/0154397 | A1 | 10/2002 | Takahama |
| 2011/0157601 | A1 | 6/2011 | Sebesta et al. |
| 2013/0148182 | A1 | 6/2013 | Yu et al. |

FOREIGN PATENT DOCUMENTS

| | | |
|---|---|---|
| WO | WO 2010/11221 | 1/2010 |
| WO | WO 2010/037861 | 4/2010 |
| WO | WO 2011/09925 | 1/2011 |
| WO | WO 2012/062805 | 5/2012 |
| WO | WO 2015/063566 | 5/2015 |

OTHER PUBLICATIONS

P. Marquet, B. Rappaz, P. J. Magistretti, E. Cuche, Y. Emery, T. Colomb, and C. Depeursinge, "Digital holographic microscopy: a noninvasive contrast imaging technique allowing quantitative visualization of living cells with subwavelength axial accuracy," Opt. Lett. 30, 468-470 (2005).
E. Cuche, P. Marquet, and C. Depeursinge, "Simultaneous amplitude-contrast and quantitative phase-contrast microscopy by numerical reconstruction of Fresnel off-axis holograms," Appl. Opt. 38, 6994-7001 (1999).
E. Cuche, F. Bevilacqua, and C. Depeursinge, "Digital holography for quantitative phase-contrast imaging," Opt. Lett. 24, 291-293 (1999).
B. Kemper, P. Langehanenberg, S. Kosmeier, F. Schlichthaber, C. Remmersmann, G. Von Bally, C. Rommel.
C. Mann, L. Yu, C.-M. Lo, and M. Kim, "High-resolution quantitative phase-contrast microscopy by digital holography," Opt. Express 13, 8693-8698 (2005).
E. Sanchez-Ortiga, P. Ferraro, M. Martinez-Corral, G. Saavedra, and A. Dobias, "Digital holographic microscopy with pure-optical spherical phase compensation," J. Opt. Soc. Am. A 28, 1410-1417 (2011).
T. Colomb, F. Montfort, J. K HN, N. Aspert, E. Cuche, A. Marian, F. Charrire, S. Bourquin,P. Marquet, and C. Depeursinge, "Numerical parametric lens for shifting, magnification, and complete aberration compensation in digital holographic microscopy," J. Opt. Soc. Am. A 23, 3177-3190 (2006).
T. Colomb, E. Cuche, F. Charrire, J. K HN, N. Aspert, F. Montfort, P. Marquet, and C. Depeursinge, Automatic procedure for aberration compensation in digital holographic microscopy and applications to specimen shape compensation, Appl. Opt. 45, 851-863 (2006).
P. Ferraro, S. De Nicola, A. Finizio, G. Coppola, S. Grilli, C. Magro, and G. Pierattini, "Compensation of the Inherent Wave Front Curvature in Digital Holographic Coherent Microscopy for Quantitative Phase-Contrast Imaging," Appl. Opt. 42, 1938-1946 (2003).
L. Yu and M. K. Kim, "Wavelength-scanning digital interference holography for tomographic three-dimensional imaging by use of the angular spectrum method," Opt. Lett. 30, 2092-2094 (2005).
T. Kreis, Handbook of Holographic Interferometry: Optical and Digital Methods (Wiley vch Verlag Ed, Weinheim, 2005).
T. Zhang and I. Yamaguchi, "Three-dimensional microscopy with phase-shifting digital holography," Opt. Lett. 23, 1221-1223 (1998).
U. Schnars, "Direct phase determination in hologram interferometry with use of digitally recorded holograms," J. Opt. Soc. Am. A 11, 2011-2015 (1994).
I. Yamaguchi and T. Zhang, "Phase-shifting digital holography," Opt. Lett. 22, 1268-1270 (1997).
D. Claus and D. Iliescu, "Optical parameters and space-bandwidth product optimization in digital holographic microscopy,"Appl. Opt. 52, A410-A422 (2013).
K. W. Seo, Y. S. Choi, E. S. Seo, and S. J. Lee, "Aberration compensation for objective phase curvature in phase holographic microscopy,"Opt. Lett. 37, 4976-4978 (2012).
P. Ferraro, G. Coppola, S. De Nicola, A. Finizio, S. Grilli , M. Iodice, C. Magro, and G. Pierattini, "Digital holography for characterization and testing of MEMS structures," in Optical MEMs, 2002. Conference Digest. 2002 IEEE/LEOS International Conference on, 2002), 125-126.
A. Doblas, E. S'nchez-Ortiga, M. Martnez-Corral, G. Saavedra, P. Andr S, and J. Garcia Sucerquia, "Shift-variant digital holographic microscopy: inaccuracies in quantitative phase imaging," Opt. Lett. 38, 1352-1354 (2013).
D. Carl, A. Höink, B. Kemper, J. Schnekenburger, and G. V. Bally, "Digital holographic multi-focus quantitative phase contrast microscopy," in DGaO Proceedings, 2005).

MICROSCOPE, METHOD AND COMPUTER PROGRAM FOR OBTAINING QUANTITATIVE PHASE IMAGES BY MEANS OF DIGITAL HOLOGRAPHIC MICROSCOPY

FIELD OF THE ART

In a first aspect, the present invention generally relates to a microscope for obtaining quantitative phase images by means of digital holographic microscopy, including an optical telecentric afocal system, and more particularly to a microscope with recording means recording a hologram in the image plane of the optical system.

A second aspect of the invention relates to a method for obtaining quantitative phase images by means of digital holographic microscopy which comprises recording a hologram in the image plane of an optical telecentric afocal system.

A third aspect of the invention relates to a computer program suitable for implementing part of the steps of the method of the second aspect.

PRIOR STATE OF THE ART

The characteristic which makes DHM (Digital Holographic Microscopy) unique is its capability of obtaining quantitative phase images [3, 4, 6] of transparent samples with microscopic dimensions without needing to label or stain them. Even though there are other microscopy methods that allow analysing phase objects, they only provide qualitative information of the phase of the specimen [16]; methods such as the Zernike and Nomarski methods can be mentioned in this category. DHM allows retrieving the complex amplitude diffracted by an object by means of using the principles of digital holography [17]. By knowing the complex amplitude diffracted by the object, it is possible to calculate amplitude or phase images.

Conventional DHM methods [1-4, 6, 7, 9, 10, 18, 19] use off-image-plane recording and/or do not use afocal-telecentric systems for recording holograms. Off-image-plane recording is a characteristic that has been inherited from the start of the modern development of DHM and is the most widespread [4]; it has been preserved to this day [5, 20]. Said condition introduces several unwanted characteristics in DHM:

It is impossible to obtain information of the specimen in real time. The application of numerical propagation algorithms is required in order to retrieve the information of the experiment, the DHM user sees a hologram instead of the image of the specimen on the microscope display.

It does not make full use of the optimized design of microscope objectives for operating in the conjugate object-image planes, introducing optical aberrations in the recorded holograms.

The two preceding characteristics together prevent DHM systems available today from being able to provide images the resolution of which is limited only by diffraction (as occurs with images provided by a conventional optical microscope) but rather they provide images the resolution of which is considerably worse.

Like in off-image-plane recording, the use of non-afocal-telecentric schemes for recording holograms in DHM systems was proposed since the beginning [3, 4] and remains to this day [5, 21]. Some alternatives for recording DHM holograms [7, 8, 22] have been proposed in the literature.

The non-afocal-telecentric architecture commonly used in DHM means that the system has the following difficulties:

Reconstructed DHM phase images have phase curvature aberration [3], which entails the use of complex numerical methods for a posteriori elimination thereof [1, 9-11, 18, 21].

In addition to the complexity of the numerical methods for compensating for the phase curvature, it has been demonstrated that said numerical approximations maintain a residual curvature that disrupts quantitative phase measurements [23].

Without placing any importance on the thickness of the sample under study, phase images undergo phase wrapping inherited from the curvature of the recording system [1, 3-5, 21].

The diffracted orders carrying the information of the sample under study are scattered in the spectral domain which makes the correct filtering of zero-order and twin images difficult [18].

Automatic compensation of the reference beam in off-axis configurations becomes more difficult due to the scattering of the diffracted orders of the hologram.

The scattering of the diffracted orders limits the available bandwidth space, which reduces the limiting spatial resolution that can be attained by the DHM which, in any case, will be less than that which can be attained by the optical microscope operating with the same objective lens system.

The solution of the negative characteristics indicated above has resulted in the proposal of DHM systems that exclusively perform the task of a posteriori phase quantification at a high computing and economic cost. The high computing cost of the methodology limits its application to tasks that require real time quantified phase information and its high economic cost has made the technique an exclusive tool of very few research and development centres.

Generally, earlier phase quantification systems by means of DHM were performed by means of developing independent microscopes, with off-image-plane recording, and generally without using afocal-telecentric systems. For this reason, earlier phase quantification methodologies by DHM require i) propagating the complex field retrieved from the hologram, and ii) numerically compensating for the phase curvature introduced by the use of non-afocal-telecentric recording systems. These conditions entail the aforementioned characteristics that are unappealing for current DHM systems.

Nevertheless, there are articles which proposed the use of afocal-telecentric systems in DHM [8], and the effect which the residual phase curvature of numerical compensation processes has on quantitative phase images was studied [23].

In the DHM with the afocal-telecentric system described in [8], as in all known DHMs, the hologram is recorded in a more distant plane with respect to the image plane, which is the plane recommended in the state of the art, such as in [3, 20] for example, where it is established that the state of the art advices recording the hologram in a plane that is even more distant with respect to the image plane or focus of the microscope for off-axis holography to prevent problems such as: the improper use of the dynamic range of digital cameras when recording bright details of the objects or the broadening of high spatial frequencies [20].

All this means that in holographic microscopes known in the state of the art, a hologram that does not at all resemble the specimen under study is obtained, so the sample cannot be focused on when the image is taken, i.e., it cannot be focused in real time, obtaining information of the specimen in real time not being possible, post-processing [39] and numerical propagation being necessary to retrieve the information of the experiment.

In summary, there are conventional optical microscopes that can focus on the sample and obtain 2D images, and on the other hand, there are holographic microscopes that cannot focus on the sample in real time and record holograms from which 3D information of the sample can be retrieved by means of a posteriori methods. It is impossible for current DHM users to focus on the sample in real time since the user sees on the microscope display a hologram instead of the actual image of the specimen. Focusing is done digitally with the differed processing of the recorded hologram.

References [24-28] describe different proposals of conventional DHMs produced and on the market, and references [29-37] are patent documents describing different DHMs of the state of the art.

On the other hand, references [19] and [38] describe the implementation of a DHM module or kit on a commercial Zeiss® axioplan 2 microscope. Said module operates under the principles set out by the same authors as reference [6], which make the DHM microscope obtained by means of implementing said module a system that does not achieve great results in terms of spatial resolution since it cannot attain the diffraction limit established by the host microscope. Likewise, due to the number of operations required for retrieving information of the specimen, reconstruction cannot be implemented in real time. Obviously, by following the advices of the state of the art, the hologram is recorded in a plane other than the image plane.

Lateral resolution (which could be measured with a USAF 1951 test, for example) of the device of reference [38] can clearly be improved as it does not use a telecentric configuration (which generates resolution losses because the hologram is contaminated by the residual phase factor), records the hologram in a distant plane with respect to the image plane, and does not use optimal settings.

US2013014182 discloses a method and apparatus for reducing speckle noise in an image of an object. The method includes, placing the object in an interferometer at a first position along a beam path of an object beam, irradiating the object with the object beam, moving the object from the first position to a second position by longitudinally shifting the object along the beam path of the object beam, irradiating the object with the object beam at the second position. At each of the first and second positions a holographic image formed by interference between the object beam and a reference beam is recorded. As opposed to the reference beam of the present invention the reference beam of this apparatus is diverging, spherical. The lens L4 produces a diverging, spherical reference beam at the sensor plane. The sphericity of the reference beam is necessary for compensating the spherical wavefront generated at the object beam, due to the fact that the detection is not produced at the image plane.

WO2010037861 refers to a method of operating a transmission holographic microscope (HM) to detect 3D objects smaller than the classical limit of resolution of optical microscopy (300 nm) in which a Fourier filtering is performed with an optical stop. The present invention has not an optical stop. The system proposed in WO2010037861 is not a telecentric afocal system.

Figure 3:
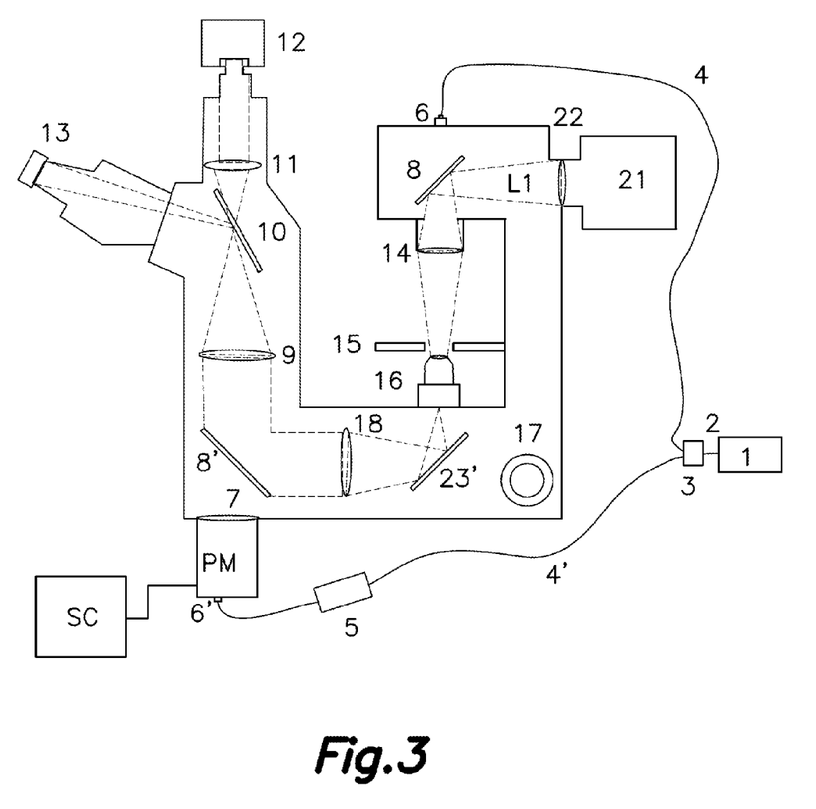
FIG. 3 shows the same microscope as FIG. 2, but in this case working in an alternative manner as a conventional optical microscope, similarly to that of FIG. 1, thus demonstrating the hybrid operation (holographic mode and conventional mode) of the microscope of the first aspect of the invention for one embodiment.

WO2012062805 discloses a method for characterizing transparent particles by means of a holographic microscope, as may be seen on FIG. 3, under several operation modes based on a twin system. The microscope proposed in present invention instead of using twin system L4 uses an optical telecentric afocal system. The system proposed in WO2012062805 is not a telecentric afocal system.

REFERENCES

1. J. Kuhn, F. Charriere, T. Colomb, E. Cuche, F. Montfort, Y. Emery, P. Marquet, and C. Depeursinge, "Axial subnanometer accuracy in digital holographic microscopy," Measurement Science & Technology 19, 074007 (2008).
2. P. Marquet, B. Rappaz, P. J. Magistretti, E. Cuche, Y. Emery, T. Colomb, and C. Depeursinge, "Digital holographic microscopy: a noninvasive contrast imaging technique allowing quantitative visualization of living cells with subwavelength axial accuracy," Opt. Lett. 30, 468-470 (2005).
3. E. Cuche, P. Marquet, and C. Depeursinge, "Simultaneous amplitude-contrast and quantitative phase-contrast microscopy by numerical reconstruction of Fresnel off-axis holograms," Appl. Opt. 38, 6994-7001 (1999).
4. E. Cuche, F. Bevilacqua, and C. Depeursinge, "Digital holography for quantitative phase-contrast imaging," Opt. Lett. 24, 291-293 (1999).
5. B. Kemper, P. Langehanenberg, S. Kosmeier, F. Schlichthaber, C. Remmersmann, G. von Bally, C. Rommel, C. Dierker, and J. Schnekenburger, "Digital Holographic Microscopy: Quantitative Phase Imaging and Applications in Live Cell Analysis," Handbook of Coherent-Domain Optical Methods, ISBN 978-1-4614-5175-4. Springer Science+ Business Media New York, 2013, p. 215 1, 215 (2013).
6. D. Carl, B. Kemper, G. Wernicke, and G. von Bally, "Parameter-Optimized Digital Holographic Microscope for High-Resolution Living-Cell Analysis," Appl. Opt. 43, 6536-6544 (2004).
7. C. Mann, L. Yu, C.-M. Lo, and M. Kim, "High-resolution quantitative phase-contrast microscopy by digital holography," Opt. Express 13, 8693-8698 (2005).
8. E. Sánchez-Ortiga, P. Ferraro, M. Martínez-Corral, G. Saavedra, and A. Doblas, "Digital holographic microscopy with pure-optical spherical phase compensation," J. Opt. Soc. Am. A 28, 1410-1417 (2011).
9. T. Colomb, F. Montfort, J. Kühn, N. Aspert, E. Cuche, A. Marian, F. Charrière, S. Bourquin, P. Marquet, and C. Depeursinge, "Numerical parametric lens for shifting, magnification, and complete aberration compensation in digital holographic microscopy," J. Opt. Soc. Am. A 23, 3177-3190 (2006).
10. T. Colomb, E. Cuche, F. Charrière, J. Kühn, N. Aspert, F. Montfort, P. Marquet, and C. Depeursinge, "Automatic procedure for aberration compensation in digital holographic microscopy and applications to specimen shape compensation," Appl. Opt. 45, 851-863 (2006).
11. P. Ferraro, S. De Nicola, A. Finizio, G. Coppola, S. Grilli, C. Magro, and G. Pierattini, "Compensation of the Inherent Wave Front Curvature in Digital Holographic Coherent Microscopy for Quantitative Phase-Contrast Imaging," Appl. Opt. 42, 1938-1946 (2003).
12. L. Yu and M. K. Kim, "Wavelength-scanning digital interference holography for tomographic three-dimensional imaging by use of the angular spectrum method," Opt. Lett. 30, 2092-2094 (2005).
13. T. Kreis, *Handbook of Holographic Interferometry: Optical and Digital Methods* (Wiley-vch Verlag Ed, Weinheim, 2005).

14. T. Zhang and I. Yamaguchi, "Three-dimensional microscopy with phase-shifting digital holography," Opt. Lett. 23, 1221-1223 (1998).
15. I. Yamaguchi and T. Zhang, "Phase-shifting digital holography," Opt. Lett. 22, 1268-1270 (1997).
16. M. Pluta, *Advanced light microscopy* (PWN, 1988).
17. U. Schnars, "Direct phase determination in hologram interferometry with use of digitally recorded holograms," J. Opt. Soc. Am. A 11, 2011-2015 (1994).
18. E. Cuche, P. Marquet, and C. Depeursinge, "Spatial Filtering for Zero-Order and Twin-Image Elimination in Digital Off-Axis Holography," Appl. Opt. 39, 4070-4075 (2000).
19. B. Kemper, D. Carl, A. Höink, G. von Bally, I. Bredebusch, and J. Schnekenburger, "Modular digital holographic microscopy system for marker free quantitative phase contrast imaging of living cells," in Biophotonics and New Therapy Frontiers, Proc. SPIE 6191 (SPIE, 2006), 61910T-61910T.
20. D. Claus and D. Iliescu, "Optical parameters and space-bandwidth product optimization in digital holographic microscopy," Appl. Opt. 52, A410-A422 (2013).
21. K. W. Seo, Y. S. Choi, E. S. Seo, and S. J. Lee, "Aberration compensation for objective phase curvature in phase holographic microscopy," Opt. Lett. 37, 4976-4978 (2012).
22. P. Ferraro, G. Coppola, S. De Nicola, A. Finizio, S. Grilli, M. Iodice, C. Magro, and G. Pierattini, "Digital holography for characterization and testing of MEMS structures," in *Optical MEMs, 2002. Conference Digest. 2002 IEEE/LEOS International Conference on*, 2002), 125-126.
23. A. Doblas, E. Sánchez-Ortiga, M. Martínez-Corral, G. Saavedra, P. Andrés, and J. Garcia-Sucerquia, "Shift-variant digital holographic microscopy: inaccuracies in quantitative phase imaging," Opt. Lett. 38, 1352-1354 (2013).
24. "Lynceé Tech DHM" (2013), retrieved http://www.lynceetec.com/.
25. "Ovizio Imaging System" (2013), retrieved http://www.ovizio.com/.
26. "Holographic phase imaging" (2013), retrieved http://www.phiab.se/.
27. "Resolution Optics" (2013), retrieved http://resolution-optics.com/.
28. "Trimos" (2013), retrieved http://kb.trimos.ch/.
29. A. K. Asundi, W. Qu, and O. Choo, "Digital Holographic Microscopy," US 2011/0043878 A1 (Feb. 24, 2011).
30. D. Carl, B. Kemper, and G. v. Bally, "Method of numerically reconstructing at least an object plane using a digital off-axis hologram and digital holographic microscope," EP 1748327 A1 (Jan. 31, 2007).
31. J.-S. Chen, S.-H. Kuo, C. W. Su, and J.-T. Liang, "Multi-color off-axis digital holographic system and the imaging method thereof," U.S. Pat. No. 8,325,400 B2 (Dec. 4, 2012).
32. E. Cuche, C. Depeursinge, P. Magistretti, and P. Marquet, "Apparatus and method for digital holographic imaging," U.S. Pat. No. 6,943,924 B2 (2005).
33. B. Das, C. S. Yelleswarapu, and D. V. G. L. N. Rao, "Systems and methods of dual-plane digital holographic microscopy," US 2013/0070251 A1 (Mar. 21, 2013).
34. F. Dubois and C. Yourassowsky, "Digital holographic microscope for 3D imaging and process using it," U.S. Pat. No. 7,362,449 B2 (Apr. 22, 2008).
35. L. Gisselsson, A. Mölder, and M. C. Sebeste, "Analysis of transparent biological objects," US 20110157601 A1 (Jun. 30, 2011).
36. M. Sebesta, K. Alm, A. Langberg, A. Mölder, J. Persson, and L. Gisselsson, "Method for and use of digital holographic microscopy and imaging on labelled cell samples," EP 2534540 A1 (Dec. 19, 2012).
37. M. Sebesta, J. Persson, L. Gisselsson, A. Moelder, and A. Laangberg, "Analysis of ova or embryos with digital holographic imaging," EP 2446251 A1 (May 2, 2012).
38. D. Carl, A. Höink, B. Kemper, J. Schnekenburger, and G. v. Bally, "Digital holographic multi-focus quantitative phase contrast microscopy," in *DGaO Proceedings*, 2005).
39. Method for simultaneous amplitude and quantitative phase contrast imaging by numerical reconstruction of digital holograms, U.S. Pat. No. 6,262,818 B1.

DESCRIPTION OF THE INVENTION

There is a need to provide an alternative to the state of the art covering the drawbacks found therein by means of providing a DHM and an operating method that provides results and performances exceeding those known in the state of the art, which allows focusing in real time, attaining the spatial resolution established by the optics of the hologram recording system and optimizing the use of bandwidth space.

For such purpose, in a first aspect, the present invention relates to a microscope for obtaining quantitative phase images by means of digital holographic microscopy comprising, in a known manner:
  a coherent light source and a coherent light beam splitter arranged at the output thereof for generating an object beam with which a sample is illuminated, and a reference beam;
  recording means (such as a CCD camera) recording a hologram of said sample from an interference pattern of said reference beam and a beam generated in said sample by the transmission or reflection of said object beam thereon; and
  an optical system including optical elements arranged spaced apart from one another forming:
    a main optical path between a point of entry of said object beam and said recording means, including optical elements making up a telecentric afocal system; and
    a reference optical path arranged between a point of entry of said reference beam and said recording means, and sharing part of the optical elements with said main optical path.

Unlike known digital holographic microscopes, in the microscope proposed by the first aspect of the invention, the recording means thereof characteristically record said hologram in the image plane of the optical system, which thus allows performing said focusing in real time which DHMs of the state of the art do not allow performing.

The microscope proposed by the first aspect of the present invention optimizes the use of bandwidth space for obtaining images limited only by diffraction.

According to one embodiment, said optical system comprises in said main optical path an objective collecting said beam generated in said sample and a tube lens, forming said hologram in the image focal plane of said tube lens.

Advantageously, the optical system also comprises in said main optical path the following optical elements arranged in order from said point of entry of the object beam to the recording means: a first beam splitter allowing the passage of the object beam there through, a condensing lens, a sample holder, said objective, a mirror, said tube lens, a second beam splitter reflecting the beam generated in the sample, a lens, a swinging mirror or separating plate and an imaging lens.

The optical system of the digital holographic microscope proposed by the first aspect of the invention also comprises in said reference optical path, according to one embodiment, the following optical elements arranged in order from said point of entry of the reference beam and the recording means: a collimating lens of variable inclination that allows varying the angle formed by the reference beam with the optical axis of the microscope, said second beam splitter allowing the passage of the reference beam there through, said lens, said swinging mirror or separating plate and said imaging lens.

Generally, the microscope also comprises an intensity and optical path changer arranged between one of the outputs of the coherent light beam splitter and said point of entry of the reference beam.

Even though, for some embodiments the microscope proposed by the first aspect of the invention is only a DHM; for another more preferred embodiment the microscope is also an optical microscope, i.e., also intended for obtaining images by means of optical microscopy, for which purpose it comprises:
 a white light source arranged for illuminating said sample;
 an arrangement of optical elements including the optical elements of said main optical path of said optical system arranged between said white light source and the recording means; and
 said recording means also recording an optical image of said sample in the image plane of the optical system.

A hybrid microscope, i.e., a DHM and an optical microscope, is thus formed, being able to work in an alternative manner in any of the two DHM or conventional optical operation modes, thanks to selection means included in the microscope to select working in one mode or the other.

According to one embodiment, the microscope further comprises a lens arranged at the output of said white light source, an eyepiece arranged for receiving the white light beam reflected by said swinging mirror or separating plate and allowing direct viewing of the optical image of the sample and a focusing mechanism.

According to one embodiment, the microscope of the first aspect of the invention comprises control means controlling the operation of the elements of the microscope and including processing means in connection with the recording means that receive the recorded hologram in digital format and process it for calculating the quantitative phase of the sample.

A second aspect of the present invention relates to a method for obtaining quantitative phase images by means of digital holographic microscopy which comprises, in a known manner:
 generating a coherent light beam and splitting it into an object beam and a reference beam;
 emitting said object beam on a sample for generating in said sample a corresponding beam by the transmission or reflection of said object beam on said sample, said object beam passing through part of a main optical path of an optical system and said generated beam passing through the rest of said main path, where said main path comprises optical elements making up a telecentric afocal system formed by at least one objective for collecting said beam generated in said sample, and a tube lens; and
 recording a hologram of said sample from an interference pattern of said reference beam and said beam generated in the sample.

Unlike known methods, the method proposed by the second aspect of the invention comprises characteristically recording said hologram in the image plane of said optical system, at the end of said main path.

The method proposed by the second aspect of the invention optimizes the use of bandwidth space for obtaining images limited only by diffraction and with minimum perturbation of the quantitative phase images, as will be described below in several embodiments of the method.

According to one embodiment of the method proposed by the second aspect of the invention, the optical system is the optical system of an optical microscope, said recording of said hologram being performed in recording means of the optical microscope.

For a preferred embodiment, the method comprises setting/optimizing the following parameters of the optical microscope to provide a digital hologram the quantitative phase image of which has maximum lateral resolution and minimum perturbation, and optimizing the use of bandwidth space for obtaining images limited only by diffraction:
 NA: numerical aperture of the objective of the optical microscope;
 M: lateral magnification of said telecentric system;
 Δp: pixel size of said recording means; and
 ϕ: angle formed by the reference beam with the optical axis of the microscope;
such that the following equations are complied with:

$$\frac{NA}{M} \leq \frac{\lambda}{\sqrt{2}(\sqrt{2}+3)\Delta p} \text{ and } \sin^{-1}\left(\frac{3}{\sqrt{8}\pi}\frac{NA}{M}\right) \leq \phi$$

where λ is the wavelength of the coherent light beam.

Optimization of capture parameters allows the method to obtain transparent sample reconstructions with the best possible quality in terms of both quantitative phase and intensity distribution. Insertion of a coherent reference beam in the optical system of a conventional microscope in conjunction with detection in the image plane of the microscope facilitates system characterization, the conditions assuring the following points being able to be defined:
 Capture of a diffraction-limited hologram: The resolution is determined by the optical system and the recording means, not by the misuse thereof.
 Reconstruction that lacks possible noise which introduces the zero-order of the diffraction in object-orders.
 Maximization of usable bandwidth-space in spatial frequency domain.
 The resolution is not changed due to numerical propagation factors.

Minimum perturbation refers to the following aspects:
 1. The use of the telecentric system in the image plane eliminates effects associated with quadratic phase terms, as set out in references [8] and [23].
 2. Fulfilling the conditions set out in the equations indicated above eliminates any possible noise as a result of combining the object-orders and the zero-order of diffraction. These noises are manifested in detriment of the spatial resolution that can be attained with the digital holographic microscope. This is proven by the fact that reference [19]

attains a spatial resolution in the order of three times less than the resolution which the present invention may attain with the use of a configuration similar to that described by the authors of reference [19].

3. The same condition which reduces the spatial resolution of the microscope affects the values recorded in the quantitative phase images.

4. Recording in image plane minimizes optical aberrations which can be introduced by microscope objectives. To assure that the object is located in the object plane of the microscope objective and the image thereof is generated in the image plane of the image forming system, the use of the optical design optimized to minimize aberrations that could be introduced by the hologram recording system is made.

5. Recording in the image plane eliminates the need to apply numerical propagation algorithms to retrieve the focused information of the object. This reduces the introduction of numerical noise characteristic of these methods.

According to one embodiment, the method comprises capturing and processing said hologram by means of sequentially performing the following steps, in a closed loop:
  recording the digital hologram;
  calculating the fast Fourier transform of the digital hologram;
  filtering in the Fourier domain the object-order and automatically identifying the angle formed by the reference beam and its corresponding compensation if working off-axis, or phase shift if working in-axis;
  calculating the inverse fast Fourier transform of the object-order; and
  calculating the quantitative phase of the specimen or sample.

The preceding steps to be performed in a closed loop are implemented, for one embodiment, by means of suitable software to be installed in the control system of the actual optical microscope and/or in an additional control system, such software making up a third aspect of the invention relating to a computer program including code instructions which implement said steps when run in a computer.

The teaching of the present invention allow also the provision of a kit for adapting a conventional optical microscope for obtaining quantitative phase images by means of digital holographic microscopy comprising, as is known through reference [19]:
  a coherent light source and a coherent light beam splitter connected or to be connected to the output thereof for generating, through a first output, an object beam with which a sample is illuminated, and, through a second output, a reference beam;
  first coherent light guiding means to be connected between said first output of said coherent light beam splitter and a point of entry of a main optical path of the optical microscope including optical elements making up a telecentric afocal system and extending between said point of entry and recording means of the optical microscope;
  second coherent light guiding means to be connected between said second output of said coherent light beam splitter and a point of entry of a reference optical path sharing part of the optical elements with said main optical path and ending in said recording means; and
  an optical element to be arranged in said reference optical path for conferring a specific inclination to the reference beam with respect to the optical axis of the optical microscope.

Unlike the known proposals, the kit furthermore characteristically comprises:
  supporting means for supporting said optical element with variable inclination,
  actuation means for varying the inclination of the optical element, acting on the optical element or on said supporting means, and
  a closed loop control system for automatically evaluating in the Fourier space a series of parameters of the optical microscope which determine the performance of the microscope when it is used for obtaining quantitative phase images by means of digital holographic microscopy, i.e. when is used as a DHM, determining an optimal value of the angle of inclination i) for the reference beam from the result of said evaluation, and controlling said actuation means so that they perform said variation of inclination according to said optimal value of the angle of inclination i).

For the correct operation of the closed loop control system, when the kit in mounted on the optical microscope, such mounting will include duly connecting (by means of cable or wirelessly) the outputs of corresponding devices sensing such parameters to inlets of the control system of the kit, as well as connecting a corresponding output of the control system with the actuation means for controlling same by means of sending corresponding electrical signals through said output (by means of cable or wirelessly).

Once mounted on the optical microscope, the proposed kit forms the hybrid microscope proposed by the first aspect of the invention and operates by implementing the method of the second aspect.

Alternatively or complementarily to the use of the recording means of the conventional optical microscope, the kit is intended for using, and it therefore includes for one embodiment, its own recording means to be installed in the microscope and adapted for recording holograms in the image plane.

According to one embodiment, said supporting means and said actuation means comprise a motorized rotating platform configured for varying the inclination of the optical element by rotation thereof.

According to one embodiment:
  said first coherent light guiding means comprise a fibre optic section with a first end to be connected to said first output of the coherent light beam splitter, and a fibre optic connector to be connected to a second end of said fibre optic section and intended for being coupled to a first input opening of the optical microscope defined in said point of entry of the main optical path; and
  said second coherent light guiding means comprise a fibre optic conductor with an incorporated intensity and optical path changing element, said fibre optic conductor having a first end to be connected to said second output of the coherent light beam splitter, and a fibre optic connector to be connected to a second end of said fibre optic conductor and intended for being coupled to a second input opening of the optical microscope defined in said point of entry of the reference optical path or to an intermediate element coupled to said second opening, such as said motorized rotating platform.

According to one embodiment, the kit further comprises:
  a first beam splitter to be arranged in the optical microscope, replacing a first mirror thereof arranged between a white light source and a condensing lens of the optical microscope, such that said first beam splitter allows the passage of the object beam there through and reflects the white light beam generated by said white light source, or vice versa, for directing both towards the condensing lens; and a second beam splitter to be arranged in the optical microscope, replacing a second mirror thereof arranged between a tube lens and a lens of the optical microscope, such that said second beam splitter allows the passage of the reference beam there through and reflects the beam from the tube lens, or vice versa, for directing both towards said recording means of the optical microscope.

For one embodiment, said optical element of variable inclination is a collimating lens of variable inclination to be arranged between the point of entry of the reference beam and said second beam splitter.

According to a preferred embodiment, the closed loop control system of the kit includes an algorithm responsible for performing said determination of the optimal value of the angle of inclination φ alone or in collaboration with an electronic system of the optical microscope, such that the equation of the method described above for a preferred embodiment thereof is complied with, particularly the equation:

$$\sin^{-1}\left(\frac{3}{\sqrt{8}\,\pi}\frac{NA}{M}\right) \le \phi$$

said parameters of the optical microscope to be evaluated in the Fourier space being NA, M and Δp, the meaning of which has already been explained above.

Since the present invention, in its four aspects (microscope, method, computer program and kit of adaptation), works with images recorded in the image plane by means of an afocal-telecentric system, it does not suffer from the drawbacks described above in the section on the prior state of the art, and it therefore allows obtaining quantitative phase images in real time. Additionally, for the case of the hybrid microscope, the minimum required modification of the optical microscope for obtaining quantitative phase images allows users to simply and quickly change the optical microscope from phase quantification mode to the conventional operation mode. This feature is unique to the present invention.

In addition to the inclusion of the closed loop control system and the elements associated with it, the kit or module adaptable to an optical microscope for obtaining quantitative phase images by means of DHM proposed by the kit technically differs from its predecessors in the following aspects:

The required minimum modification of the optical microscope for obtaining quantitative phase images allows users to simply and quickly change the optical microscope from phase quantification mode to conventional operation mode.

Since it records holograms in the image plane of an afocal-telecentric system, it does not require using robust autofocus systems, numerical propagation and phase compensation for obtaining quantitative phase images.

It allows obtaining information of the specimen in real time. Since numerical propagation is not required to retrieve the information from the experiment, users can see the phase-quantified image of the specimen on the microscope display.

It makes full use of the optimized design of the microscope objectives by operating in their conjugate object-image planes, which reduces optical aberrations in the recorded holograms.

It can operate at the diffraction limit established for a conventional optical microscope by operating with the same objectives.

The reconstructed DHM phase images do not have phase curvature aberration [3], which eliminates the use of complex numerical methods for a posteriori elimination thereof [1, 9-11, 18, 21].

As it does not require numerical methods for phase curvature compensation, it does not suffer phase image perturbation due to residual curvature [23].

For thin samples, the phase images do not have phase wrapping.

The diffracted orders carrying the information of the sample under study are points in the spectral domain which facilitates the correct filtering of zero-order and twin images [18].

Automatic compensation of the reference beam in off-axis configurations is facilitated due to the point form of the diffracted orders of the hologram.

Use of the available bandwidth space is optimized, which makes achieving spatial resolution that is comparable to that which can be attained by the optical microscope operating with the same objective system possible.

The use of the microscope, method, program and kit of the present invention provides the following comparative advantages with respect to other methods for quantitative phase imaging:

1—Reduction of the costs necessary for obtaining quantitative phase images.

2—Real time quantitative phase measurement for samples without staining.

3—Minimization of possible optical aberrations in the image forming system.

4—Use of sample handling, stability, robustness, among other features, provided by commercial microscopes.

5—Possibility of operating in phase image quantification mode or the operation modes provided by the conventional host microscope.

6—Use of easy-to-use processing software for obtaining quantitative phase images.

7—Optimized operation at the diffraction limit established by the optics of the host microscope.

8—Introduction of less numerical noise when processing the recorded holograms for calculating the quantitative phase images.

The present invention applies to any field of research and/or development in which the information of interest is or can be coded in the phase information of a propagating optical field and it is impossible or undesirable to stain the specimen under study. Possible fields of application may include various life science and material science sectors. For example, in the field of biology quantitative phase measurement in samples without staining is of great interest because not only does it allow quantitative viewing of said microscopic samples, but this process can be carried out without needing to introduce external agents in said samples. By means of the present invention it would be possible to combine the equipment typically used in microscopy with the DHM technique, increasing the flexibility of said study methods and allowing direct comparison of the results obtained by means of using other techniques. Given that the number of operations necessary for obtaining quantitative phase images is much less than in a conventional DHM system, the handling of the software of the present invention is considerably simplified, making it user-friendly and eliminating the inconvenient process of recording the holograms in advance.

BRIEF DESCRIPTION OF THE DRAWINGS

The foregoing and other advantages and features of the invention will be better understood from the following detailed description of several embodiments in reference to the attached drawings which must be interpreted in an illustrative and non-limiting manner, in which.

DETAILED DESCRIPTION OF SEVERAL EMBODIMENTS

Figure 1:
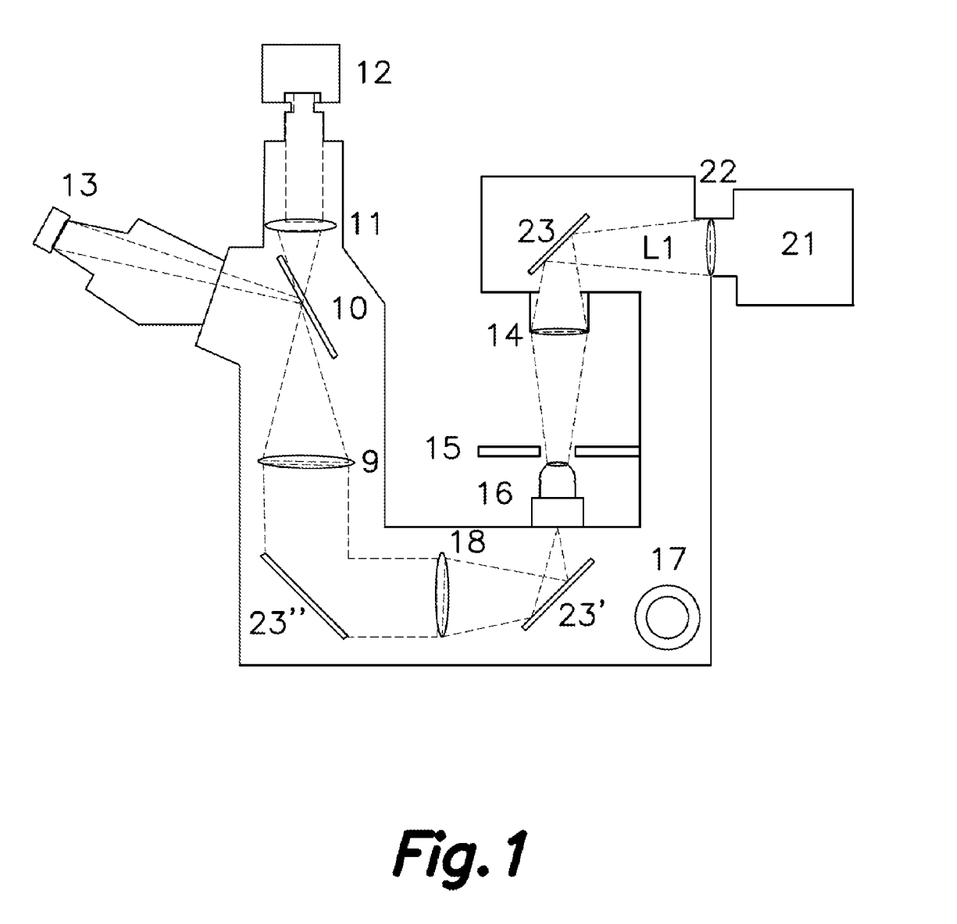
FIG. 1 schematically shows a conventional optical microscope with its main external and internal elements, as well as the trajectory followed therein by the white light beam used in the microscope.

FIG. 1 illustrates a diagram of a commercial optical microscope showing its fundamental parts and depicting the trajectory of the light L1 therein using a dashed line, and it includes the following elements: 21.—white light source; 22.—lens; 23, 23',23"—mirrors; 14.—condensing lens; 15.—sample holder stage; 16.—microscope objective; 17.—focusing mechanism; 18.—tube lens; 9.—lens; 10.—swinging mirror or separating plate; 11.—image forming lens; 12.—recording means, generally a CCD camera; 13.—eyepiece.

The optical path followed by the white light beam L1 to the CCD camera 12 is that which has been referred to herein as the main optical path.

Figure 2:
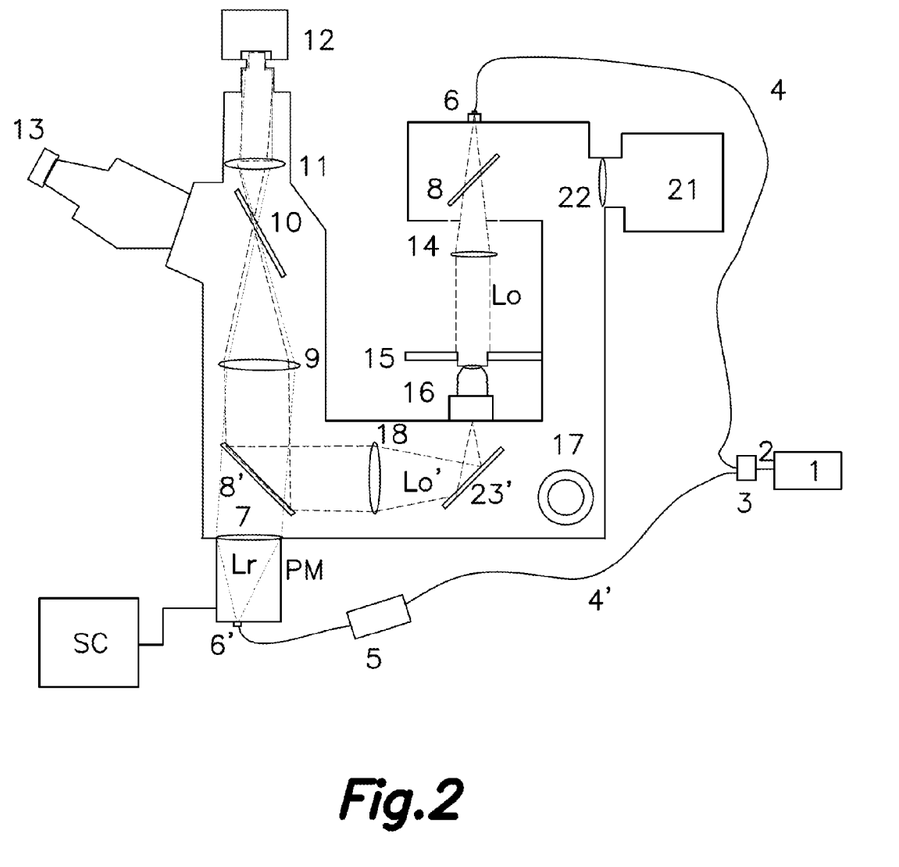
FIG. 2 shows the holographic microscope of the first aspect of the invention according to one embodiment, obtained by means of adapting the microscope of FIG. 1 by means of the kit, the trajectories of the object beam and of the reference beam used in the microscope being illustrated.

FIGS. 2 and 3 illustrate the hybrid microscope, i.e., the microscope which can work in DHM mode (see FIG. 2) and in conventional mode (see FIG. 3), once modified, according to one embodiment, by means of mounting the elements of the kit, particularly:

a coherent light source 1, generally a laser, and a coherent light beam splitter 3 connected to the output thereof (by means of a fibre optic coupler 2) for generating, through a first output, an object beam Lo with which a sample is illuminated (not illustrated), and, through a second output, a reference beam Lr;

a fibre optic section 4 with a first end connected at the first output of the coherent light beam splitter 3, and a fibre optic connector 6 connected to a second end of the fibre optic section 4 and coupled to a first input opening of the optical microscope defined in the point of entry of the main optical path (above the element 8 in the FIGS. 2 and 3);

a fibre optic conductor 4' with an incorporated intensity and optical path changing element 5, said fibre optic conductor 4' having a first end connected to the second output of the coherent light beam splitter 3, and a fibre optic connector 6' connected to a second end of the fibre optic conductor 4' and coupled to an intermediate element PM coupled to a second input opening of the optical microscope defined in the point of entry of the reference optical path;

a collimating lens of variable inclination 7 arranged in the reference optical path for conferring a specific inclination to the reference beam Lr with respect to the optical axis of the optical microscope;

said intermediate element PM, which is a motorized rotating platform PM that holds the collimating lens 7 and varies the inclination of the lens upon turning; and a closed loop control system SC for automatically evaluating in the Fourier space a series of parameters of the optical microscope, determining an optimal value of the angle of inclination $\phi$ for the reference beam Lr from the result of said evaluation, and controlling the motorized rotating platform PM so that they perform said variation of inclination of the collimating lens 7 according to the optimal value of the angle of inclination $\phi$.

The kit also includes:

a first beam splitter 8 which is arranged in the optical microscope, replacing the first mirror 23 (see FIG. 1), and it allows the passage of the object beam Lo there through and the reflection of the white light beam L1; and a second beam splitter 8' which is arranged in the optical microscope, replacing the second mirror 23" (see FIG. 1), and it allows the passage of the reference beam Lr there through and the reflection of the generated beam Lo'.

In a more basic version, the kit does not include the closed loop control system SC nor the motorized rotating platform PM, the collimating lens 7 being mounted with a manual rotating platform for modifying, in the optical microscope, the angle between the object beam and the reference beam.

FIG. 2 illustrates the operation of the microscope in DHM mode, where the object beam Lo strikes the sample (not illustrated), and the beam Lo' generated in said sample, in this case by the transmission of the object beam Lo there through, follows the rest of the main optical path to the CCD or CMOS camera 12 (or any other type of arrangement incorporating an array of photosensitive elements) where the reference beam Lr inclined with respect to Lo' also arrives, a hologram of the sample being recorded in the CCD camera 12 from an interference pattern of both beams Lr and Lo'.

One of the main features used by the microscope and kit of the present invention is the optimized design of the microscope objective 16 and tube lens 18 of the commercial optical microscope. This design prevents optical fields recorded in the image plane of the tube lens 18 from having phase curvature, an essential feature in DHM.

By comparing FIG. 1 with FIGS. 2 and 3, it is observed that the modified microscope is made up of a small number of elements perfectly coupleable in the commercial microscope which is subject to minimal intervention for inserting/replacing the mentioned parts. As it is coupled to a commercial microscope, the modified microscope also uses the sample handling, stability, and robustness, among other features, provided by the commercial microscopes.

FIG. 3 shows the same microscope as FIG. 2, but in this case working in an alternative manner as a conventional optical microscope, similarly to that of FIG. 1, thus demonstrating the hybrid operation (holographic mode and conventional mode) of the microscope of the first aspect of the invention, for one embodiment. This drawing shows the possibility provided by the microscope and kit of the present invention of allowing users to change from a quantitative image phase mode to the commercial microscope characteristic image mode. In commercial operation, the microscope could operate in some of the modes available on the market.

Figure 4:
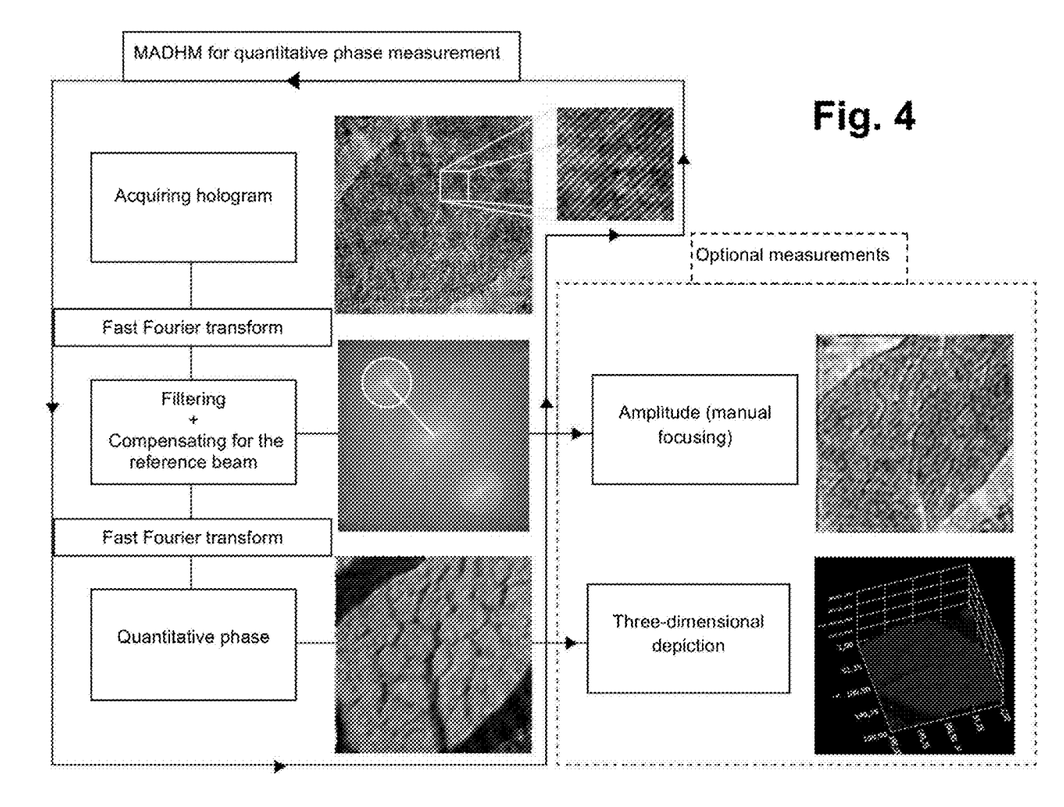
FIG. 4 schematically illustrates the different steps, some of which are essential while others are optional, to be performed by means of a suitable algorithm, implemented for example by the computer program of the third aspect of the invention, for acquiring and processing the hologram of the sample, the image of a captured hologram and the successive images that are being obtained when running the algorithm having been included in this drawing in order to better understand same.

The images recorded in the CCD camera 12 when the DHM mode is activated are processed following the diagram shown in FIG. 4. The algorithm/software for acquiring and processing the digital holograms includes the following steps:

Recording the digital hologram.
Calculating the fast Fourier transform of the digital hologram.
Filtering in the Fourier domain the object-order and automatically identifying the angle formed by the reference beam and its corresponding compensation.
Calculating the inverse fast Fourier transform of the object-order.
Calculating the quantitative phase of the specimen.

The aforementioned steps depict a closed loop (see FIG. 4) and given both the minimum number of necessary operations and short computing time, the implementation of the software for real time quantitative phase viewing is feasible without significant hardware requirements. There are a series of free parameters that the user can change at will: choosing the filter used in the Fourier space (position, shape and size), fine tuning the angle of the reference beam (if necessary), selecting the region of interest in the hologram and refractive index of the specimen for the quantitative measurement of the axial size thereof. Except for this last parameter, the rest could be omitted by performing prior microscope calibration including the information of the different microscope objectives to be used.

The amplitude of the specimen can be obtained as additional calculations for manually focusing on said specimen, and a three-dimensional depiction of the obtained quantitative phase or of its correspondence with the actual sample size can also be obtained.

For one embodiment of the microscope and the kit proposed by the present invention, they include software implementing the described algorithm previously installed in a hardware element (such as the control system SC), or in a suitable support, such as a DVD, from which it can be installed in the actual control system already included in the optical microscope.

Figure 5:
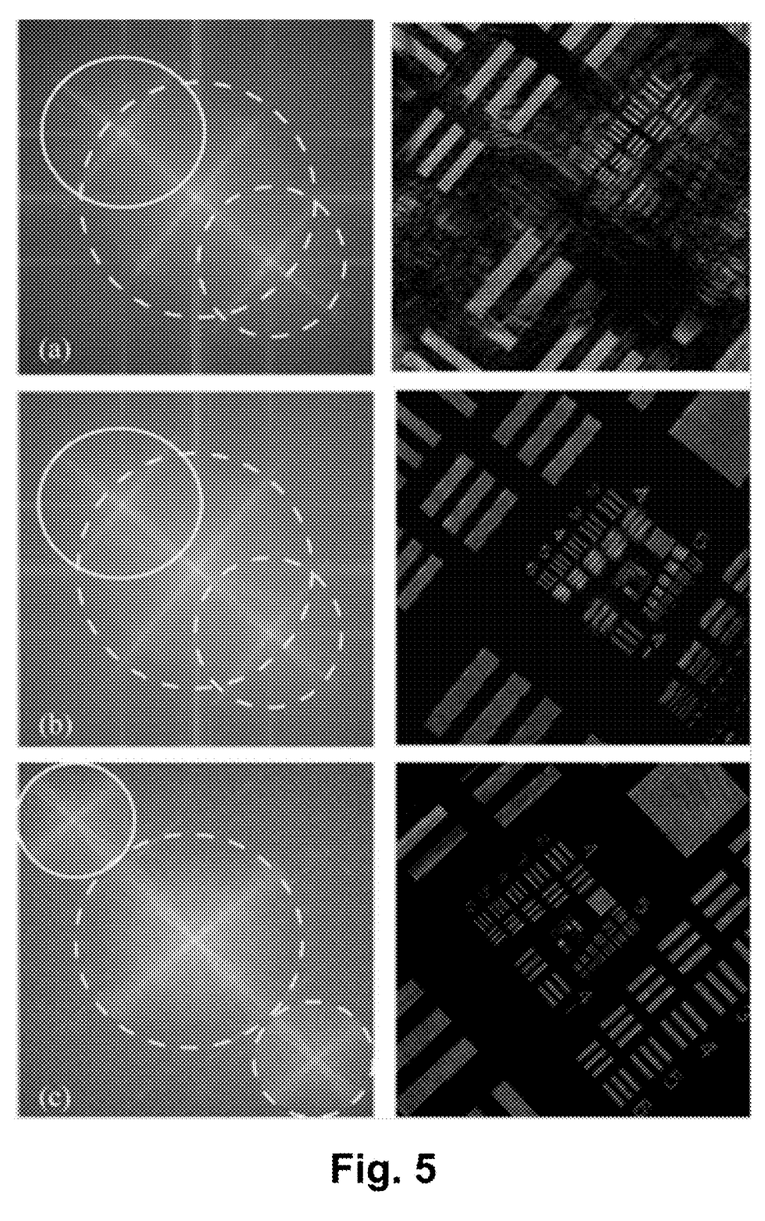
FIG. 5 are images illustrating hologram spectrum (left column) and scene reconstruction (right column) examples for three holographic microscopes with different configurations. (a) telecentric configuration with off-image-plane capture (state of the art); (b) telecentric configuration with in-image-plane capture but without optimizing the capture parameters (present invention); (c) telecentric configuration with in-image-plane capture and with optimized capture parameters (preferred example of the present invention)

FIG. 5 shows the result of the experiments in which the reconstruction of the image of a resolution test (USAF 1951) has been obtained:

FIG. 5(c): when the hologram is captured under optimal setting conditions (involving compliance with the equations described above including NA, M, $\Delta p$ and $\phi$), i.e., for a preferred embodiment of the present invention;

FIG. 5(b): when the hologram is captured in the image plane but without setting the parameters of the system, for a less preferred example of the present invention; and FIG. 5(a): when the hologram is captured off-image-plane as suggested in the state of the art.

It must be pointed out that FIG. 5 shows in the left column the Fourier transform of the hologram. This transform is what contains the information that allows performing reconstruction. The frequency content of the object (inside the solid-line circle) can be isolated without interferences with other disturbance terms only in the case of FIG. 5(c).

As can be seen in FIG. 5(c), although the microscope of the present invention is working with a lower NA, the reconstruction quality both in terms of resolution and of noise clearly improves with respect to the other two cases.

Figure 6:
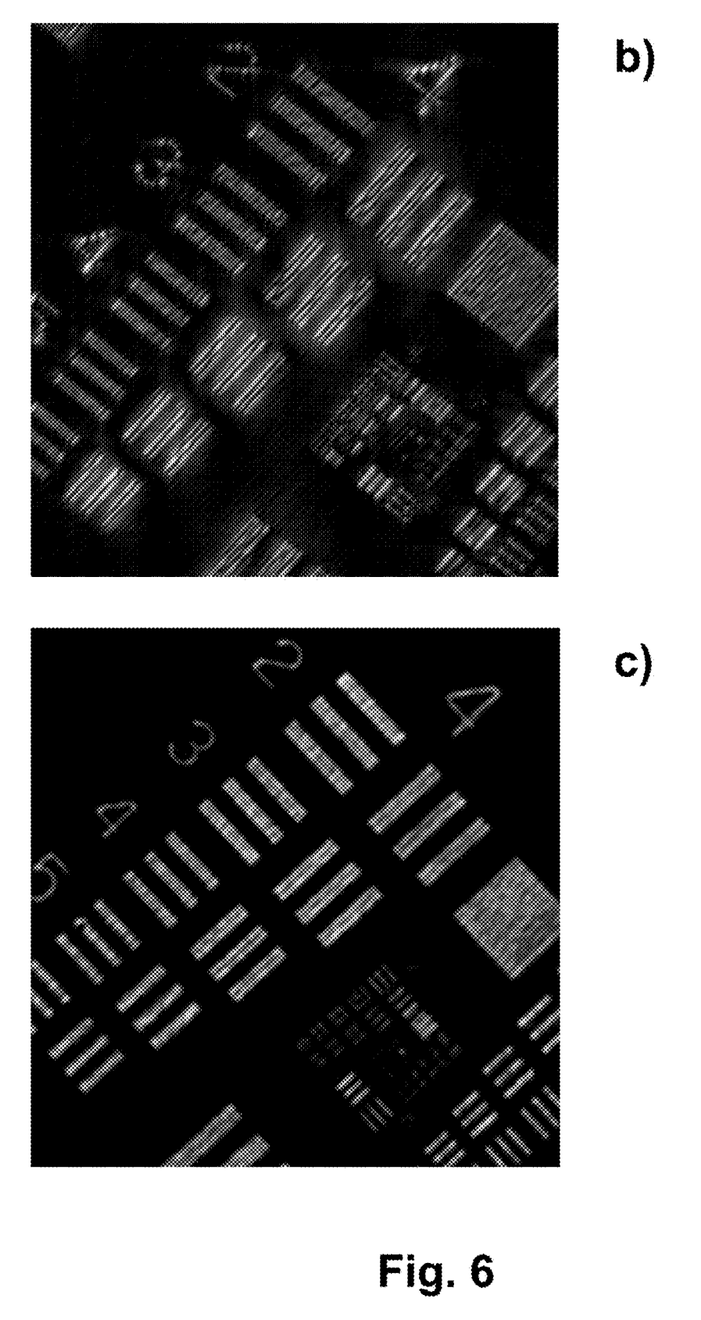
FIG. 6 shows the two images of the right column of cases b) and c) of FIG. 5 in enlarged format.

To better observe the improved resolution, FIG. 6 shows an enlarged view of the reconstructions for cases b) and c) corresponding to the embodiments of the present invention.

With respect to the calculation times, the three cases have been compared by processing with MatLab in an i7 processor with 4 Gb RAM (similar proportions would be obtained with other machines). Particularly, it has been verified that calculating reconstruction 5(c) from the hologram takes 117 milliseconds (which already provides at present a rate of 8 images per second) whereas reconstruction 5(a) takes 462 milliseconds (2 images per second).

All the aspects of the invention have the following features differentiating it from the phase quantification methods known until now:

Use of an afocal-telecentric system for recording the holograms [8]. This feature, which is built into the optical part of commercial microscopes, eliminates the phase curvature present in standard DHM systems, so it is not necessary to perform any compensation method for phase quantification [9-11].

Capturing holograms in the image plane of the microscope. This recording method allows having immediate information of the sample under study without needing to calculate the field in a plane located a distance from the plane of capture using numerical methods. Furthermore, the captured hologram is free of optical aberrations, since in this case the manufacturers use the optimized configuration of the microscope objective.

Possibility of numerical refocusing. For applications working with three-dimensional samples, the present invention allows refocusing the different sections of the sample by means of numerical calculation. This is carried out in a manner similar to how it is done with conventional DHM techniques, i.e., applying the algorithms based on angular spectrum propagation [12] or Fresnel transform [13].

Possibility of operating in an off-axis or in-axis configuration [13]. For an off-axis configuration, automatic compensation of the reference beam is allowed. For an in-axis configuration, a phase shift method is used [14, 15].

Obtaining images the resolution of which is exclusively limited by diffraction. By eliminating numerical propagation due to recording in the image plane, it is possible to set the microscope such that resolution deterioration does not occur, which allows making full use of the resolution provided by the optical microscope used as the basis.

Smaller number of operations for obtaining quantitative phase images. Since numerical propagation and numerical compensation of the phase curvature are not required, real time quantitative phase information can be provided.

Possibility of operating in phase image quantification mode or in the operation modes provided by the conventional host microscope.

A person skilled in the art would be able to introduce changes and modifications in the described embodiments without departing from the scope of the invention as defined in the attached claims.

The invention claimed is:

1. A microscope for obtaining quantitative phase images by means of digital holographic microscopy, comprising:
   a coherent light source (1) and a coherent light beam splitter (3) arranged at an output of the coherent light source to generate an object beam (Lo) with which a sample is illuminated and a reference beam (Lr);
   a recording element (12) configured and arranged to record a hologram of said sample from an interference pattern of said reference beam (Lr) and a beam (Lo') generated in said sample by the transmission or reflection of said object beam (Lo) thereon; and
   an optical system including optical elements arranged spaced apart from one another forming:
      a main optical path between a point of entry of said object beam (Lo) and said recording element (12), including optical elements making up a telecentric afocal system; and
      a reference optical path arranged between a point of entry of said reference beam (Lr) and said recording element (12), and sharing part of the optical elements with said main optical path;
   wherein:
      said recording element (12) is configured to record said hologram in the image plane of said optical system, and
      said reference beam (Lr) is plane forming an angle φ with the optical axis of the microscope such that the following equations are complied with:

$$\frac{NA}{M} \leq \frac{\lambda}{\sqrt{2}\,(\sqrt{2}+3)\Delta p} \text{ and } \sin^{-1}\left(\frac{3}{\sqrt{8}\,\pi}\frac{NA}{M}\right) \leq \phi$$

where:
   λ is the wavelength generated by the coherent light source (1),
   NA is the numerical aperture of an objective of the microscope,
   M is the lateral magnification of said telecentric afocal system, and
   Δp is the pixel size of said recording element.

2. The microscope according to claim 1, wherein said optical system comprises, in said main optical path, an objective (16) collecting said beam (Lo') generated in said sample and a tube lens (18), forming said hologram in the image focal plane of said tube lens.

3. The microscope according to claim 2, wherein the optical system comprises, in said main optical path, the following optical elements, arranged in order from said point of entry of the object beam (Lo) to the recording element (12): a first beam splitter (8) allowing the passage of the object beam (Lo) there through, a condensing lens (14), a sample holder (15), said objective (16), a mirror (23'), said tube lens (18), a second beam splitter (8') reflecting the beam (Lo') generated in the sample, a lens (9), a swinging mirror or separating plate (10) and an image forming lens (11).

4. The microscope according to claim 3, wherein the optical system comprises, in said reference optical path, the following optical elements arranged in order from said point of entry of the reference beam (Lr) and the recording element (12): a collimating lens of variable inclination (7) that allows varying the angle φ formed by the reference beam (Lr) with the optical axis of the microscope, said second beam splitter (8') allowing the passage of the reference beam (Lr) there through, said lens (9), said swinging mirror or separating plate (10) and said image forming lens (11).

5. The microscope according to claim 4, being configured for obtaining images by means of optical microscopy, for which purpose it comprises:
   a white light source (21) arranged for illuminating said sample;
   an arrangement of optical elements including the optical elements of said main optical path of said optical system arranged between said white light source (21) and the recording element (12); and
   said recording element (12) also recording an optical image of said sample in the image plane of the optical system.

6. The microscope according to claim 5, wherein the optical elements include a lens (22) arranged at an outlet of said white light source (21) and through which is directed a white light beam from the white light source (21) to illuminate said sample, the optical elements also including an eyepiece (13) arranged for receiving the white light beam reflected by said swinging mirror or separating plate (10) and allowing direct viewing of the optical image of the sample as focused with a focusing mechanism (17).

7. The microscope according to claim 6, being a hybrid microscope and comprising a selection unit to select working in an alternative manner either as a digital holographic microscope or as an optical microscope.

8. The microscope according to claim 1, comprising an intensity and optical path changer (5) arranged between one of the outputs of the coherent light beam splitter (3) and said point of entry of the reference beam (Lr).

9. The microscope according to claim 1, being configured for obtaining images by means of optical microscopy, for which purpose it comprises:
   a white light source (21) arranged for illuminating said sample;
   an arrangement of optical elements including the optical elements of said main optical path of said optical system arranged between said white light source (21) and the recording element (12); and
   said recording element (12) also recording an optical image of said sample in the image plane of the optical system.

10. The microscope according to claim 1, further comprising a control system configured to control operation of the elements of the microscope and including a processing software in connection with the recording element that receives the recorded hologram in digital format and processes same to calculate a quantitative phase of the sample.

11. A method for obtaining quantitative phase images by means of digital holographic microscopy which comprises:
   generating a coherent light beam and splitting into an object beam (Lo) and a reference beam (Lr);
   emitting said object beam (Lo) on a sample for generating in said sample a corresponding beam (Lo') by transmission or reflection of said object beam (Lo) on said sample, said object beam (Lo) passing through part of a main optical path of an optical system and said generated beam (Lo') passing through the rest of said main path, where said main path comprises optical elements making up a telecentric afocal system formed by at least one objective that collects said beam (Lo') generated in said sample; and recording a hologram of said sample from an interference pattern of said reference beam (Lr) and said beam (Lo') generated in the sample, wherein said hologram is recorded in the image plane of said optical system, at the end of said main path, and wherein said reference beam (Lr) is plane forming an angle φ with the optical axis of the microscope such that the following equations are complied with:

$$\frac{NA}{M} \leq \frac{\lambda}{\sqrt{2}\,(\sqrt{2}+3)\Delta p} \text{ and } \sin^{-1}\left(\frac{3}{\sqrt{8}\,\pi}\frac{NA}{M}\right) \leq \phi$$

where:
λ is the wavelength generated by the coherent light source (1),
NA is the numerical aperture of an objective of the microscope,
M is the lateral magnification of said telecentric afocal system, and
Δp is the pixel size of said recording element.

12. The method according to claim 11, wherein said optical system is the optical system of an optical microscope, said recording of said hologram being performed in a recording element of the optical microscope.

13. The method according to claim 12, comprising setting the following parameters of the optical microscope to provide a digital hologram of the quantitative phase image of which has maximum lateral resolution and minimum perturbation, and optimizing use of bandwidth space for obtaining images limited only by diffraction:
NA: numerical aperture of the objective of the optical microscope;
M: lateral magnification of said telecentric system;
Δp: pixel size of said recording means; and
said angle φ.

14. The method according to claim 13, comprising capturing and processing said hologram by means of sequentially performing the following steps, in a closed loop:
acquiring the digital hologram;
calculating the fast Fourier transform of the digital hologram;
filtering in the Fourier domain the object-order and automatically identifying the angle formed by the reference beam and its corresponding compensation if working off-axis, or phase shift if working in-axis;
calculating the inverse fast Fourier transform of the object-order; and
calculating the quantitative phase of the specimen or sample.

15. A non-transitory computer readable medium including computer-readable instructions recorded thereon which implement the steps of the method according to claim 14 when run in a computer.

* * * * *